United States Patent [19]

Ohsuga et al.

[11] Patent Number: 5,261,373
[45] Date of Patent: Nov. 16, 1993

[54] ENGINE EXHAUST GAS RECIRCULATION SYSTEM

[75] Inventors: Minoru Ohsuga; Toshiharu Nogi, both of Katsuta; Mamoru Fujieda, Tomobe; Yoshishige Ohyama, Katsuta, all of Japan

[73] Assignee: Hitachi, Ltd., Tokyo, Japan

[21] Appl. No.: 786,244

[22] Filed: Oct. 31, 1991

[30] Foreign Application Priority Data

Nov. 5, 1990 [JP] Japan .................... 2-297314

[51] Int. Cl.⁵ .................. F02B 17/00; F02D 41/14; F02M 25/07
[52] U.S. Cl. .................... 123/430; 123/698; 123/571
[58] Field of Search .............. 123/430, 568, 569, 570, 123/571, 419, 436, 698

[56] References Cited

U.S. PATENT DOCUMENTS

| | | | |
|---|---|---|---|
| 4,119,071 | 10/1978 | Hattori | 123/568 |
| 4,177,777 | 12/1979 | Maruyama et al. | 123/571 |
| 4,271,811 | 6/1981 | Suzuki et al. | 123/571 |
| 4,278,063 | 7/1981 | Nakamura et al. | 123/568 |
| 4,333,428 | 6/1982 | Tanaka et al. | 123/568 X |
| 4,351,298 | 9/1982 | Franke | 123/568 X |
| 4,368,707 | 1/1983 | Leshner et al. | 123/436 |
| 4,409,949 | 10/1983 | Tanaka et al. | 123/571 |
| 4,413,593 | 11/1983 | Resler, Jr. | 123/1 A |
| 4,475,524 | 10/1984 | Eckert et al. | 123/568 |
| 4,561,389 | 12/1985 | Matsumoto | 123/571 X |
| 4,938,198 | 7/1990 | Suzuki | 123/571 |
| 4,969,446 | 11/1990 | Olsson et al. | 123/568 X |
| 5,056,309 | 10/1991 | Linder et al. | 123/568 X |

FOREIGN PATENT DOCUMENTS

| | | |
|---|---|---|
| 2611806 | 9/1976 | Fed. Rep. of Germany . |
| 2651504 | 3/1978 | Fed. Rep. of Germany . |
| 8416223 | 6/1986 | Fed. Rep. of Germany . |
| 3722048 | 1/1989 | Fed. Rep. of Germany . |
| 0620286 | 4/1927 | France . |
| 0032566 | 2/1928 | France . |
| 1560334 | 3/1969 | France . |
| 2392230 | 12/1978 | France . |
| 170747 | 7/1989 | Japan .................. 123/571 |
| 8300536 | 2/1983 | PCT Int'l Appl. . |
| 8900241 | 1/1989 | PCT Int'l Appl. . |
| 1259889 | 1/1972 | United Kingdom . |
| 2073320 | 10/1981 | United Kingdom . |

OTHER PUBLICATIONS

Patent Abstracts of Japan, vol. 4, No. 114 (M-26) [596], Aug. 15, 1980; & JP-A-55 72 643 (Hitachi) May 31, 1980.
Patent Abstracts of Japan, vol. 10, No. 163 (M-487) [2219], Jun. 11, 1986; & JP-A-61 16 257 (Mazda) Jan. 24, 1986.
Patent Abstracts of Japan, vol. 12, No. 392 (M-755) [3239], Oct. 19, 1988; and JP-63 140 855 (Toyota) Jun. 13, 1988.
Patent Abstracts of Japan, p. 6979 M77; and JP-A-52 129 826 (Daihatsu Kogyo K.K.) Oct. 31, 1977.
Patent Abstracts of Japan, vol. 11, No. 238 (M-613) [2685], Aug. 5, 1987; and JP-A-62 51 747 (Nippon Denso Co., Ltd.) Jun. 3, 1987.
Patent Abstracts of Japan, vol. 12, No. 487 (M-778) [3334], Dec. 20, 1988; and JP-A-63 208 657 (Fujitsu Ten Ltd.) Aug. 30, 1988.

Primary Examiner—Willis R. Wolfe
Attorney, Agent, or Firm—Ladas & Parry

[57] ABSTRACT

An engine exhaust gas recirculation system has an intake passage (2) connected to feed an air/fuel mixture to an internal combustion engine and an exhaust passage (1) connected to discharge an exhaust gas from the internal combustion engine. An exhaust gas recirculation passage (3) is provided for feeding a portion of the exhaust gas of the exhaust passage into a cylinder of the engine such that a laminar distribution is produced in the cylinder formed by air/fuel mixture adjacent to the ignition plug and the recirculated exhaust gas distributed about the air/fuel mixture. The exhaust gas recirculation passage may open in the vicinity of an intake valve of the engine or open into the cylinder above the bottom dead center of the piston. The flow of recirculated exhaust gas may be controlled by pressure, for example by the inlet and exhaust valves of the engine and/or by a pressure control valve (31, 34). Alternatively, the exhaust gas recirculation may be controlled in a multicylinder engine by a distributor (20) which may be controlled by an engine "roughness" control signal. The EGR may be computed from outputs of an air flow sensor (7) and an intake manifold pressure sensor (50).

4 Claims, 16 Drawing Sheets

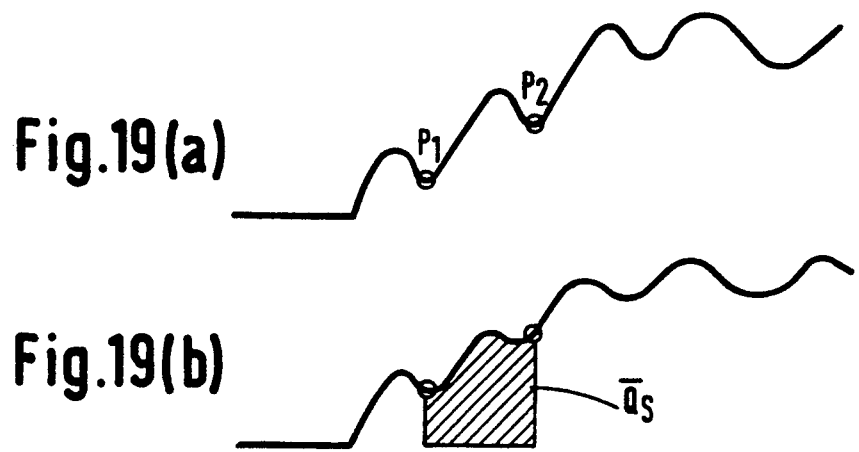
Fig.19(a)
Fig.19(b)
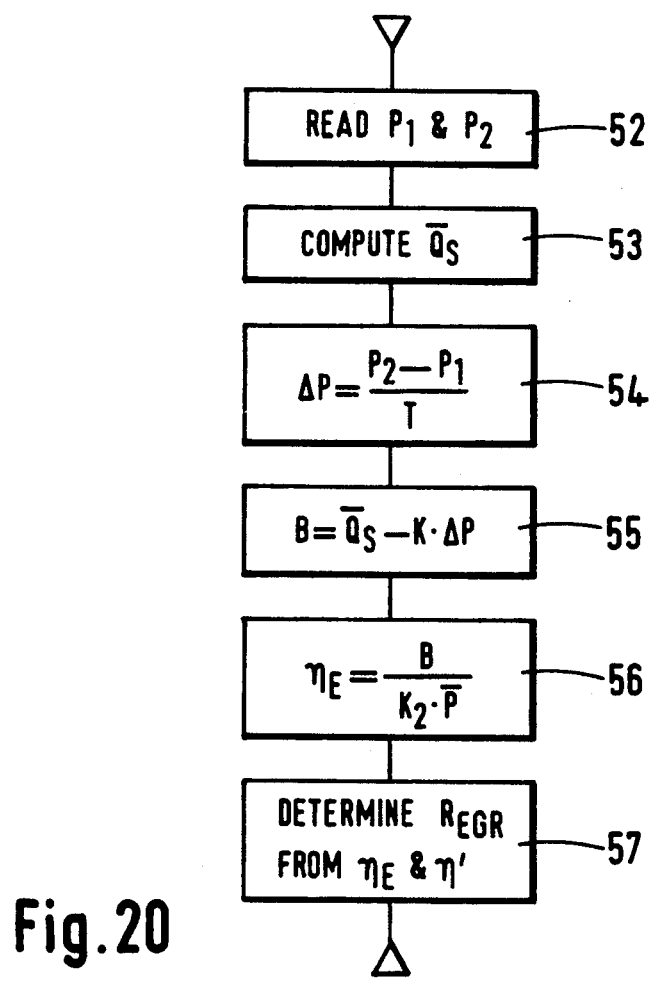
Fig.20

ENGINE EXHAUST GAS RECIRCULATION SYSTEM

BACKGROUND OF THE INVENTION

1. Field of the Invention

This invention relates to an internal combustion engine exhaust gas recirculation system.

2. Description of the Related Art

In a system of the prior art, as exemplified in Japanese Patent Publication No. 25971/1979, a hole is made in an intake pipe for the introduction of exhaust recirculation, the hole being formed in the trunk of the intake manifold.

In the aforementioned prior art, the exhaust introduction hole formed in the intake pipe is spaced well apart from the intake valve portion. As a result, the exhaust gas and the intake air are completely mixed in a collection box so that the exhaust gas is distributed over the gas when it is introduced into the cylinder. If too much exhaust gas is recirculated, combustion is deteriorated.

It is a principal object of this invention to provide an engine exhaust gas recirculation system which does not deteriorate engine performance, even if excess exhaust gas is recirculated.

SUMMARY OF THE INVENTION

According to one aspect of this invention there is provided an engine exhaust gas recirculation system comprising:

(a) an intake passage connected to feed an air/fuel mixture to an internal combustion engine;

(b) an exhaust passage connected to discharge an exhaust gas from said internal combustion engine;

(c) an exhaust gas recirculation passage for feeding the exhaust gas of said exhaust passage; and (d) timing means for feeding said portion of the exhaust gas from said exhaust passage into a cylinder in laminar form with said air/fuel mixture, such that the air/fuel mixture is adjacent an ignition plug and said portion of the exhaust gas is distributed in said cylinder away from said ignition plug.

The present invention, in order to achieve the abovespecified object, renders the exhaust gas distribution in the cylinder uniform.

Preferably, hole means are provided in the vicinity of an intake valve disposed in said intake passage and said timing means includes camshaft means for driving inlet and exhaust valves of said cylinder of said engine and fuel injection timing means.

In a multicylinder engine hole means are provided in the vicinity of an intake valve disposed in said intake passage and said timing means comprise means for directing exhaust gas in said recirculation passage to a predetermined one intake valve of a plurality of intake valves disposed in a multicylinder engine.

Advantageously, said timing means comprises a distributor having a plurality of outlet ports corresponding to the number of cylinders of said multicylinder engine, means defining a rotatable passage in said distributor for connecting an inlet of said distributor for receiving said exhaust gas and for feeding said exhaust gas to a respective one of said outlets.

Alternatively, hole means are provided in the vicinity of an intake valve disposed in said intake passage and a recirculation control valve is provided in said recirculation passage downstream of said hole means, and said timing means includes said recirculation control valve and said inlet valve whereby exhaust gas is input to a cylinder of said engine in dependence upon pressure changes at each side of said recirculation control valve.

In such an alternative said recirculation control valve is a flap valve or a spring biassed valve.

In another embodiment of the invention, said exhaust gas recirculation passage is connected to a hole means in a side of said cylinder positioned to be above a piston of said cylinder when said piston is at bottom dead center and said timing means includes a crankshaft for reciprocating said piston.

Advantageously, recirculation flow detection means are provided for determining the recirculation flow of the exhaust gas on the basis of a load signal when the exhaust gas is recirculated and a load signal when the exhaust gas is not recirculated.

Preferably, control means are provided for detecting the degree of roughness of the internal combustion engine to feed said recirculation control valve with a control signal for controlling the recirculation flow in accordance with said degree of roughness.

Conveniently, said control means determines an allowable maximum recirculation flow in accordance with said degree of roughness, thereby to determine said control signal.

Advantageously, a recirculation control valve is disposed in said exhaust gas recirculation passage for recirculating the exhaust gas at a predetermined timing and for a predetermined period during the strokes of said internal combustion engine.

If the exhaust gas introduction hole is formed in the vicinity of the intake valve, the distribution of the exhaust gas is concentrated around the intake valve. When the suction stroke begins to open the intake valve, the exhaust gas is sucked at an initial stage of suction so that its distribution in the cylinder is heterogeneous. Specifically, the exhaust gas is distributed in the lower portion of the cylinder, but a fresh air/fuel mixture is distributed in the cylinder upper portion. Even if much exhaust gas is introduced, the combustion is not deteriorated because the fresh mixture is distributed around the ignition plug in the upper portion of the cylinder. Moreover, the allowable maximum exhaust gas can be introduced on the basis of the degree of engine running roughness, which is determined by an oxygen sensor attached to the exhaust pipe. Much recirculation flow will reduce the fuel consumption and the NOx, but too much flow will lead to a misfire. The maximum exhaust flow is always introduced by detecting the misfire state with the oxygen sensor.

BRIEF DESCRIPTION OF THE DRAWINGS

The invention will now be described, by way of example, with reference to the accompanying drawings in which:

FIGS. 19(a) and (b) are graphical waveforms showing the principle of the method of FIGS. 18(a) and (b);

FIG. 20 shows a control flow diagram for calculating the EGR ratio;

In the Figures like reference numerals denote like parts.

DESCRIPTION OF THE PREFERRED EMBODIMENTS

Figure 1:
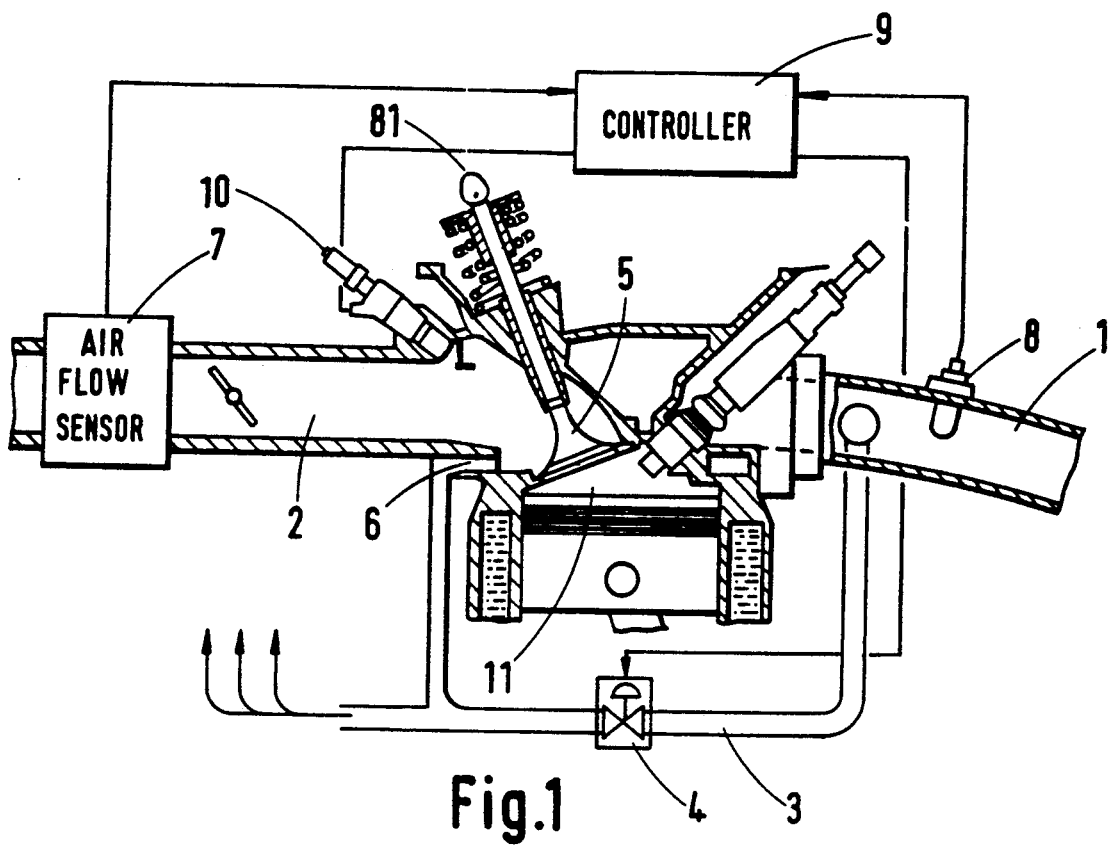
FIG. 1 shows in schematic form the structure of an engine exhaust gas recirculation system in accordance with one embodiment of this invention.

One embodiment of the present invention will be described with reference to FIG. 1 in which an exhaust gas is introduced into an intake pipe 2 by way of a passage 3 connecting an exhaust pipe 1 and the intake pipe 2. This structure is basic to the exhaust gas recirculation. The passage 3 is equipped with a flow control valve 4. In the present invention, the passage 3 has an opening or hole 6 in the vicinity of an intake valve 5 of the intake pipe 2. Moreover, a suction air flow sensor 7 and an oxygen sensor 8 have their signals inputted to a controller 9 to detect the exhaust gas recirculation (which will be referred to herein as "EGR") flow thereby to determine the optimum EGR flow. The EGR flow thus determined is fed after it has been metered by the control valve 4. The inlet valve and exhaust valve (not shown) of the engine are timingly controlled by a camshaft 81.

Figure 2:
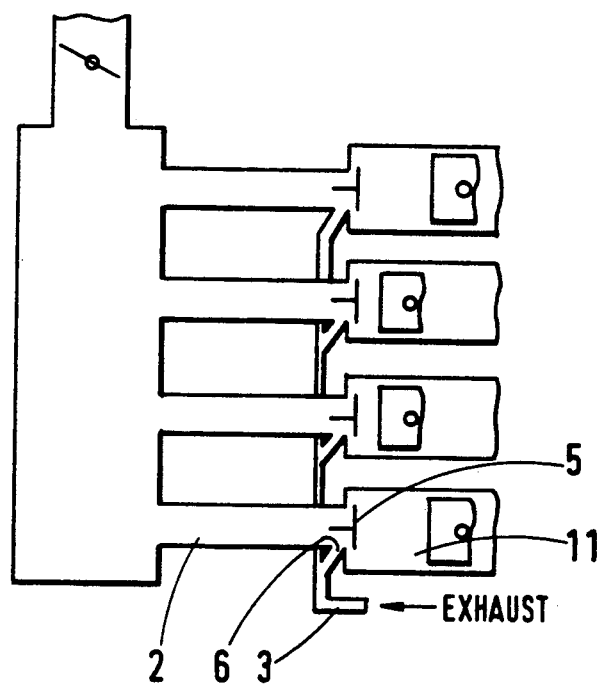
FIG. 2 shows in schematic form the structure with a multiple cylinder engine.

The structure of FIG. 1 is shown for all the cylinders of a four-cylinder engine in FIG. 2. The exhaust gas is fed via the passage 3 from the hole 6 which is opened in the vicinity of the intake valve 5 of each cylinder. Thus, communications are provided among the exhaust introduction holes 6 into the individual cylinders 11. Alternatively, an EGR pipe could extend within the intake pipe 2 to introduce exhaust gas as close as possible to the inlet valve.

FIG. 3 shows the behaviour of the exhaust gas and the fresh air/fuel mixture in each of the cylinder 11 and the intake pipe 2 at the individual strokes. These individual strokes of the engine are shown in FIG. 3(a). The behaviour of the gas at the instants (b) to (e) of FIG. 3(a) are shown at the corresponding FIGS. 3(b) to (e). FIG. 3(b) shows the state at the end period of the exhaust stroke. In FIGS. 3(b) to (e), solid circles indicate the exhaust gas, and clear circles indicate the fresh air/fuel mixture. Since the opening 6 is located near the closed intake valve 5 (FIG. 3(b)), the exhaust gas is fed therethrough upward to an upstream collector 12. As a result, the exhaust gas is exclusively distributed in the vicinity of the intake valve 5 of the intake pipe 2. Next, as shown in FIG. 3(c), only the exhaust gas is sucked into the cylinder 11. As a result, the exhaust gas is exclusively distributed in the cylinder 11. As the strokes further proceed so that the exhaust gas stagnating in the intake pipe 2 is sucked, the exhaust gas and the fresh mixture are then simultaneously sucked from the opening 6, as shown in FIG. 3(d). As a result, the fresh mixture is distributed in the upper portion of the inside of the cylinder 11 when the intake valve 5 is closed, as shown in FIG. 3(e). Since, in this distribution, the fresh mixture is exclusively present in the vicinity of an ignition plug 13, the ignitability and the combustion are hardly deteriorated even if much EGR is introduced. If the exhaust gas is thus fed to the vicinity of the intake valve 5, the EGR gas can be distributed in a laminar form in the cylinder 11 so that much gas can be introduced.

Figure 3A:
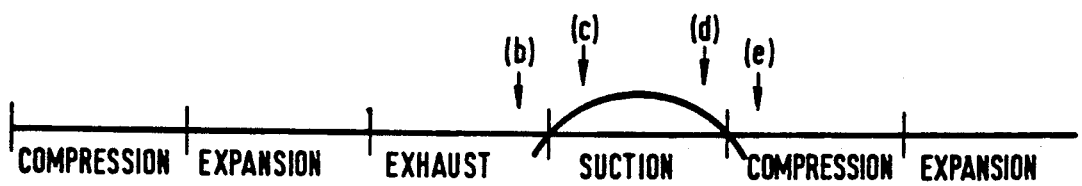
FIGS. 3(*a*) to (*e*) and 4(*a*) and (*b*) are diagrams showing the operational principle of this invention.
Figure 3B:
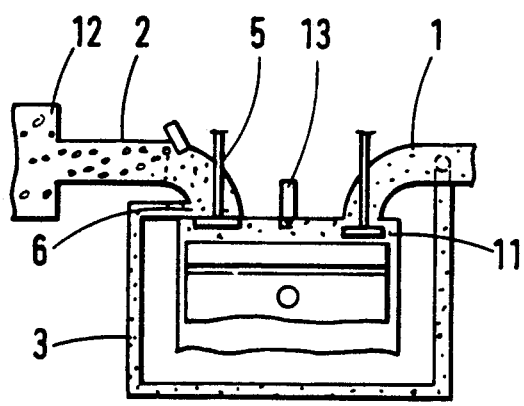
Figure 3C:
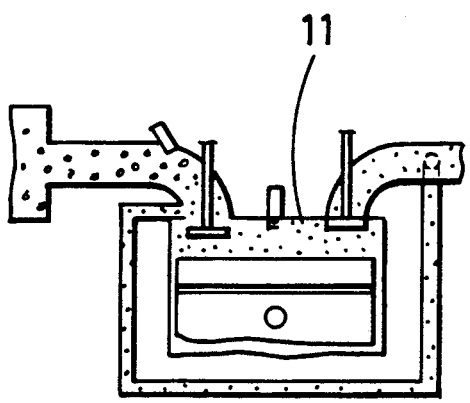
Figure 3D:
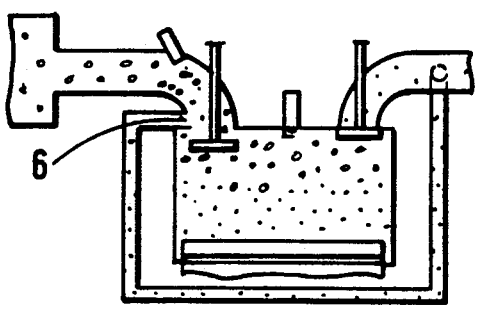
Figure 3E:
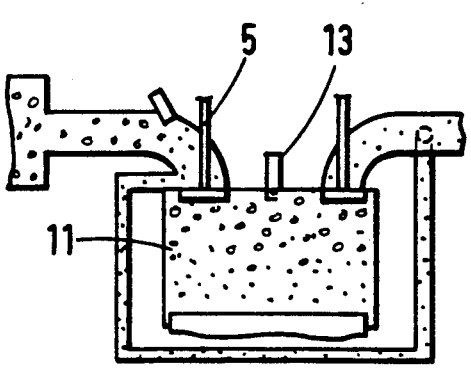
Figure 4A:
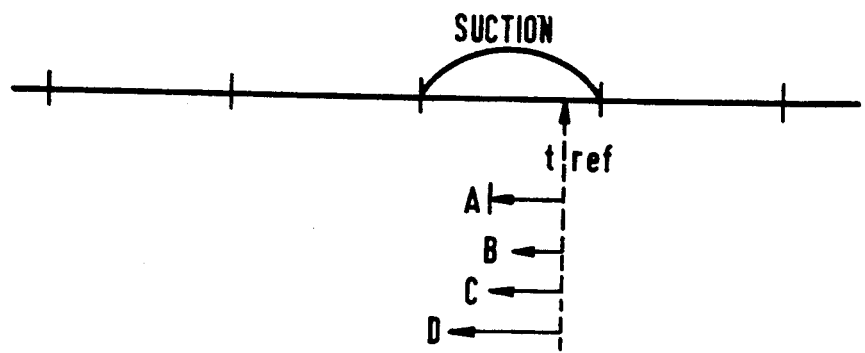
Figure 4B:
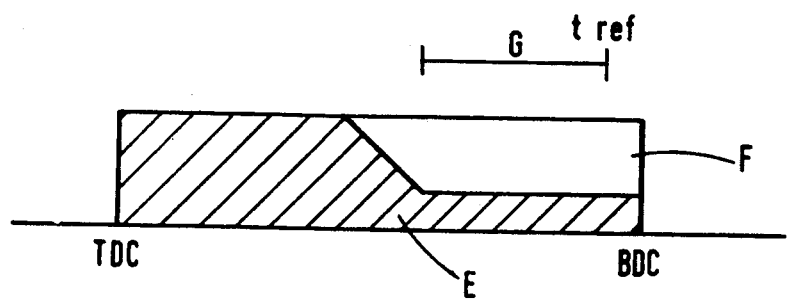

FIGS. 4(a) and (b) show one embodiment of the fuel injection method of the present invention. FIG. 4(a) shows the relationship between the suction stroke and the fuel injection time. The fuel is injected at the latter half of the suction stroke. This injection is timed when much fresh mixture is sucked into the cylinder, as shown in FIG. 3(d). Moreover, the injection ending timing tref is determined to prevent a failure in the event that the injection is not completed during the suction stroke. The injection time is elongated, if desired, toward the initial time of the suction stroke, as indicated at (A), (B), (C) and (D), while leaving the timing tref unchanged. In short, the injection beginning timing is changed to change the injection time. The behaviour of the gas and fuel to be sucked into the cylinder is shown in FIG. 4(b). The interval between top dead center-bottom dead center (TDC-BDC) indicates the suction stroke. Only the exhaust gas, as indicated at (E), flows into the cylinder. In this course, the fresh mixture, as indicated at (F), is introduced. In this case, however, a small amount of exhaust gas flows into the cylinder. The fuel injection, as indicated at (G), is timed with the introduction of the fresh mixture. By these introductions, not only the fresh mixture but also the fuel are laminated and distributed in the upper portion of the cylinder so that the ignitability and combustion are improved.

Figure 5:
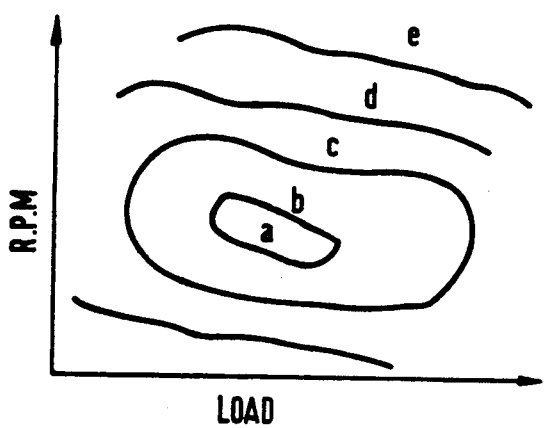
FIG. 5 shows an exhaust gas recirculation (EGR) map.

FIG. 5 shows one embodiment of the control for executing the aforementioned operations. FIG. 5 maps the EGR ratio with the R.P.M. and load of the engine. The controller 9 is stored therein with EGR ratio curves a to e. The controller 9 reads the EGR ratios and operates the control valve 4 to feed the target EGR flow.

Figure 6:
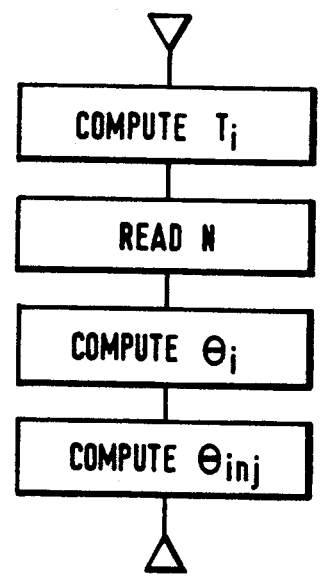
FIG. 6 shows a control flow diagram.

FIG. 6 shows a flow chart for determining the fuel injection timing. The determined injection pulse width $T_i$ is read out, and the R.P.M. N is read to determine the crank angle to which the pulse width $T_i$ corresponds. In other words, a crank angle $\theta_i$ corresponding to the time $T_i$ is determined. Next, an injection beginning timing $\theta_{inj}$ is determined from the injection ending timing tref shown in FIG. 4. The injection valve is opened at the timing $\theta_{inj}$. By the controls thus far described, the injection can be accomplished, as shown in FIG. 4(b).

Figure 7:
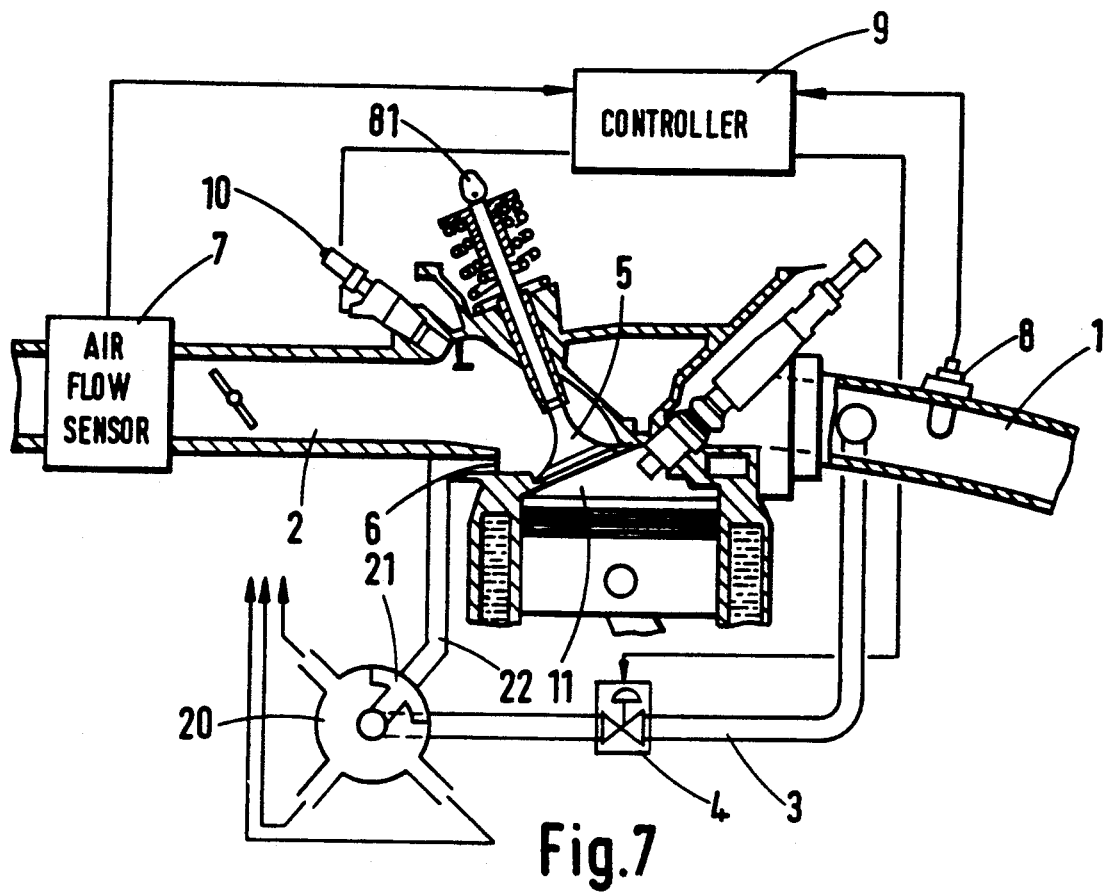
FIG. 7 shows the structure of an exhaust gas recirculation system in accordance with another embodiment of this invention.

FIG. 7 shows another embodiment, in which the passage 3 is equipped with a timing means including a distributor 20. The distributor 20 is rotated in synchronism with the engine rotation. The exhaust gas flows to the intake pipe 2 when an opening 21 in the distributor comes into registration with a respective distribution pipe 22 for each of the engine cylinders. Thus, in this embodiment, the exhaust gas is fed to the intake pipe at a predetermined timing of the engine strokes. The rotation of the distributor may be effected by drive from the crankshaft or by a motor (both not shown).

Figure 8:
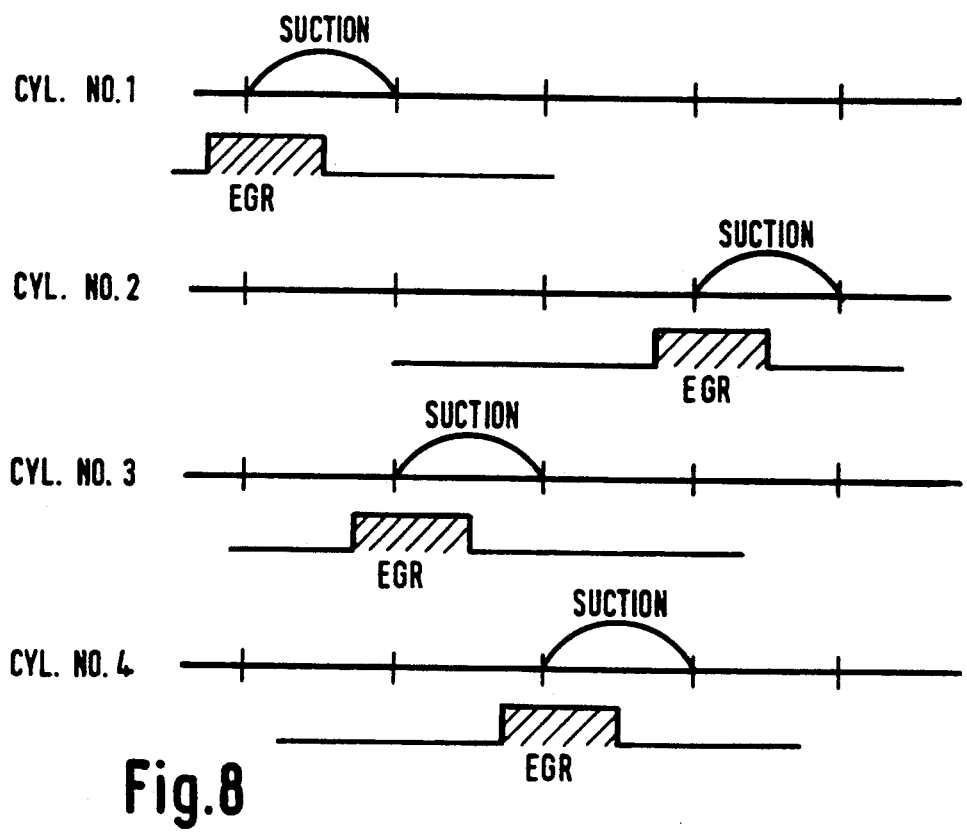
FIGS. 8 and 9(a) to (e) are diagrams showing the operational principle of FIG. 7.

FIG. 8 shows the engine strokes of each of the four cylinders and the flow behaviour of the EGR gas, as exemplified by the cylinder No. 1. The distributor 20 is so set that the EGR gas may flow exclusively at the first half of the suction stroke of the engine. In the case of a four-cycle, four-cylinder engine, the distributor sets the distribution pipe 22 to feed firstly the cylinder No. 1 and then the cylinders Nos. 3, 4 and 2 with the EGR gas. Thus, each cylinder can be fed with the gas only at its first half of the suction stroke.

Figure 9A:
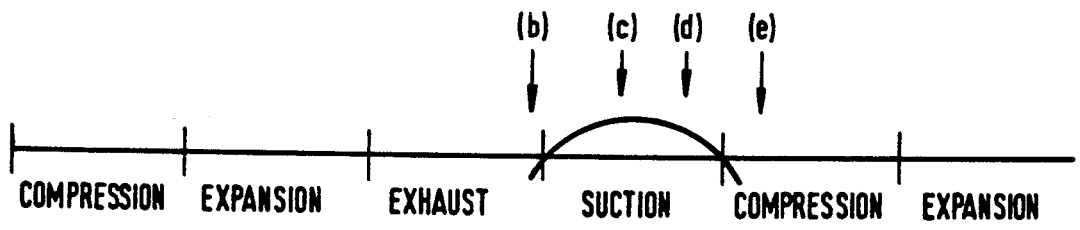
Figure 9B:
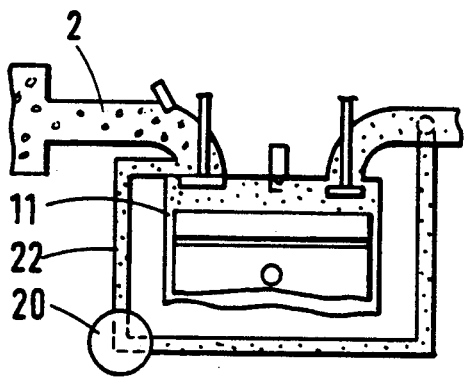
Figure 9C:
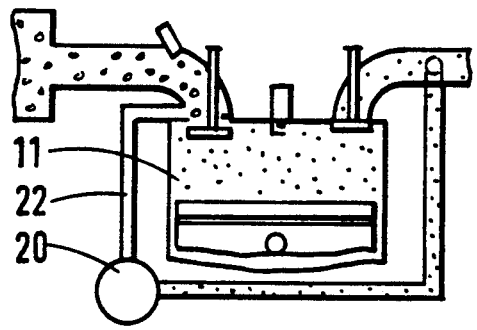
Figure 9D:
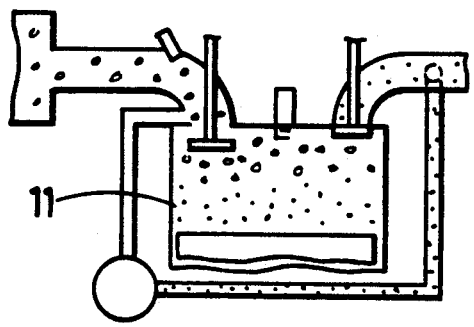
Figure 9E:
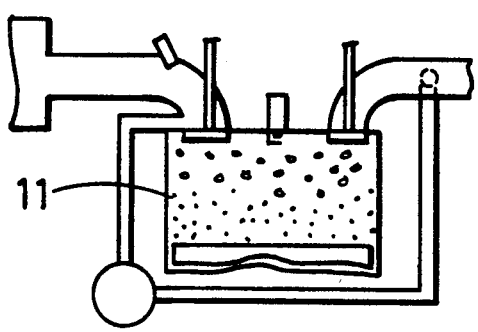

FIGS. 9(a) to (e) show the behaviour of the gas in the cylinder 11 and the intake pipe 2 of the embodiment of FIG. 7. FIG. 9(a) shows the engine strokes. The behaviour of the gas at the timings corresponding to (b) to (e) of FIG. 9(a) are shown in at the corresponding FIGS. 9(b) to (e). At the latter half of the exhaust stroke, as shown in FIG. 9(b), the distributor 20 has rotated to a position to feed the gas to the distribution pipe 22 corresponding to that cylinder. As a result, the intake pipe 2 is fed with the exhaust gas. The solid circles in FIG. 9(b) indicate the exhaust gas and the clear circles denote air/fuel mixture. In FIG. 9(c), the distributor 20 has rotated to feed no exhaust gas to the distribution pipe 22. As a result, the intake pipe 2 corresponding to this cylinder is fed with no exhaust gas. By this timing, the cylinder has sucked the exhaust gas only. In FIG. 9(d), the fresh mixture is exclusively sucked into the cylinder 11 because there is no exhaust gas to be fed. This fresh mixture is indicated by the clear circles. At the instant (e) of FIG. 9(a), and as shown in FIG. 9(e), when the suction stroke has ended, the fresh mixture is distributed in the upper portion of the cylinder 11, and the EGR gas is distributed in the lower portion. The lamination of the EGR gas is achieved by such simple structure. No exhaust gas is fed to the intake pipe 2 at the instants (c), (d) and (e) of FIG. 9. The distributor 20 is exemplified by the rotary type, but similar effects may be attained if the distribution pipe 22 corresponding to each cylinder were equipped with an ON/OFF solenoid valve.

By thus laminating the EGR gas, a stable combustion can be realized to reduce the fuel consumption and the NOx drastically even if much gas is recirculated.

Figure 10:
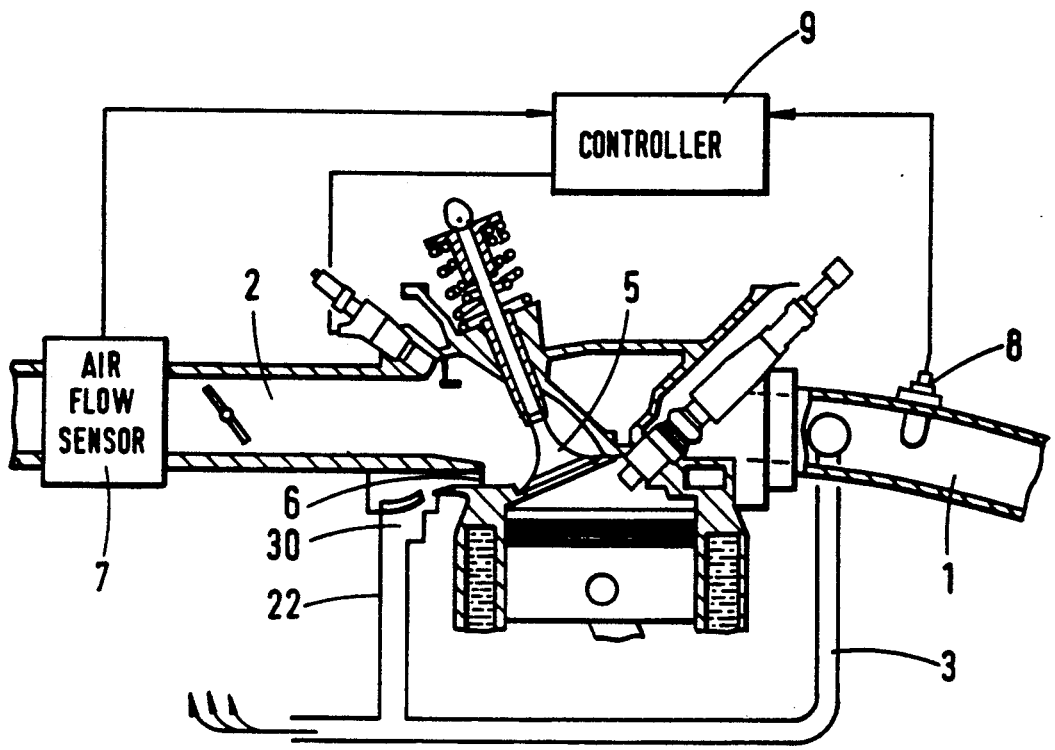
FIG. 10 shows an exhaust gas recirculation system in accordance with a further embodiment of this invention.
Figure 11A:
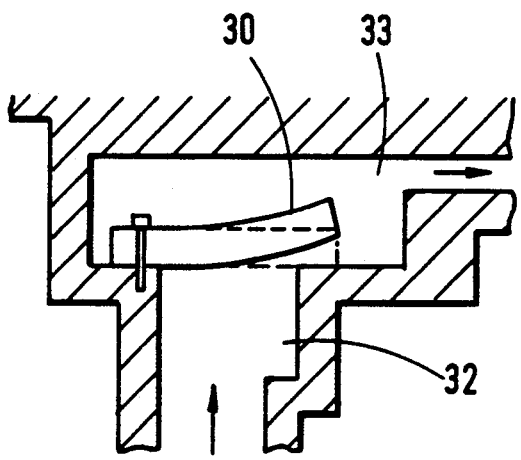
FIGS. 11(a) and (b) show the structure of a control valve in partial section used in FIG. 10.

FIG. 10 shows a further embodiment of this invention in which the distribution pipe 22 corresponding to each cylinder is equipped with a flap valve 30 which is to be opened or closed in dependence upon the exhaust pressure. In such an arrangement, the moving part is only the valve 30 so that the structure is greatly simplified. The distribution pipes corresponding to other individual cylinders are also equipped with the valves 30. More particularly, as shown in FIG. 11(a), this further embodiment is constructed to have a valve 30. The exhaust gas is introduced into a passage 32. When the pressure of the exhaust gas in the passage 32 exceeds that of the gas in an upstream passage 33, the valve 30 changes its position from closed (shown in broken lines) to open (shown in solid line) so that the gas flows, as indicated by arrow headed lines. If the pressure of the exhaust gas of the passage 32 is then overcome by the set force of the valve 30, the valve 30 is closed, as indicated by the broken lines. Thus, the exhaust gas can be fed to the intake pipe only when the exhaust pressure is high.

Figure 11B:
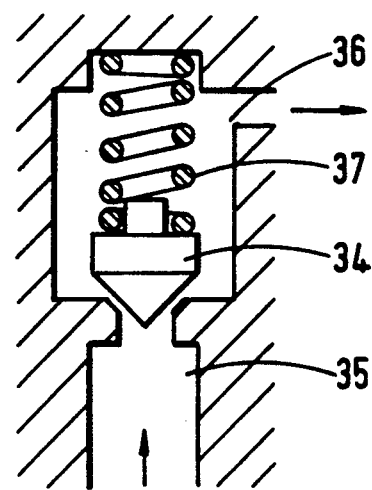

FIG. 11(b) shows another type of valve 30 that may be used in the further embodiment in which a spring biassed needle valve 34 is moved upward to feed the exhaust gas to the intake pipe when the pressure of the exhaust gas of a passage 35 exceeds the gas pressure of an upstream passage 36. The pressure, at which the valve 34 is opened, is set in terms of the force of a compression spring 37.

Figure 12A:
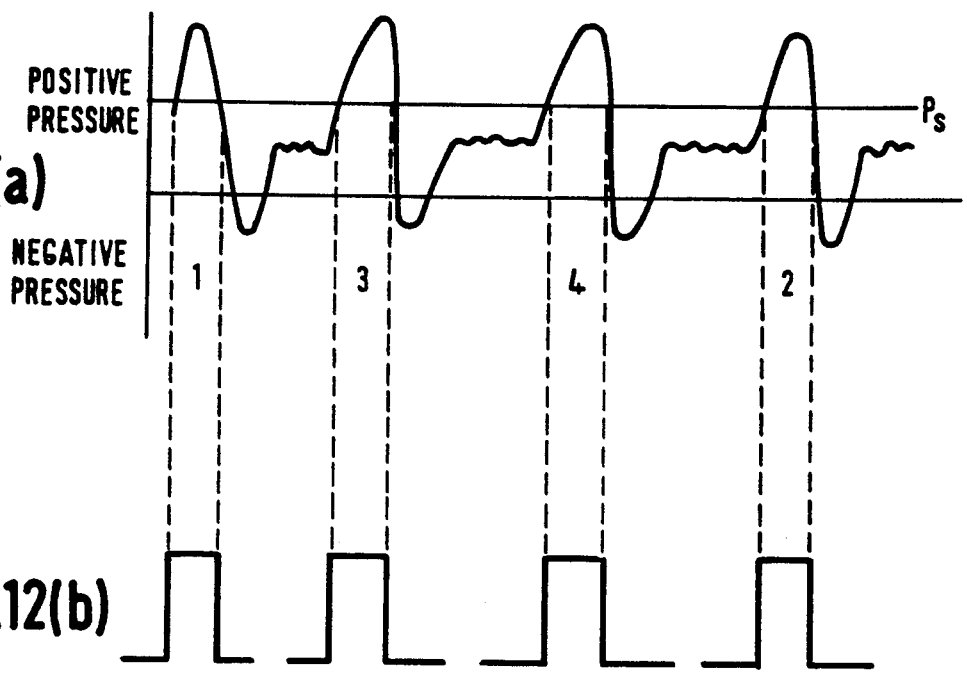
FIGS. 12(a) to (c) are diagrams showing the operational principle of the FIG. 10 embodiments.
Figure 12B:
Figure 12C:
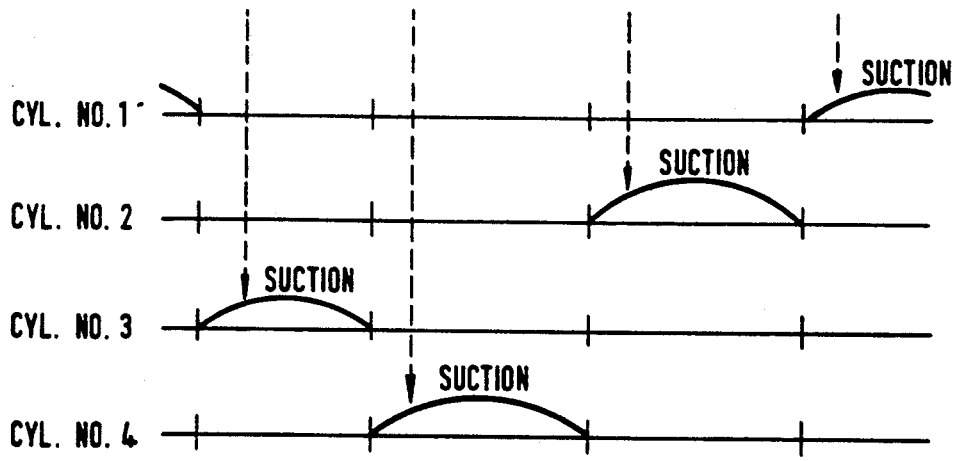

FIGS. 12(a) to (c) show the pressure change in the exhaust gas and the operations of the valve 30. FIG. 12(a) shows the pressure change in the exhaust gas in the exhaust pipe. The pressure rises in a manner to correspond to the exhaust stroke of each cylinder so that it performs periodical pulsations, as shown. This pressure acts upon the valve 30 associated with each cylinder FIG. 12(b) shows the operations of the individual valves 30. At the exhaust stroke of the cylinder No. 1, for example, the cylinder No. 3 is in the suction stroke so that the vacuum in the intake pipe 2 in the vicinity of the intake valve of the cylinder No. 3 is high. As a result, the valve 30 is opened by the pressure difference between that vacuum and the positive pressure of the exhaust gas. In other words, only the valve 30 of the cylinder in the suction stroke is opened when the pressure of the exhaust gas exceeds a certain level $P_s$. Thus, the EGR gas can be laminated by the simple structure because the gas can be fed only for a predetermined period of the engine strokes, as shown in FIG. 12(c).

Figure 13:
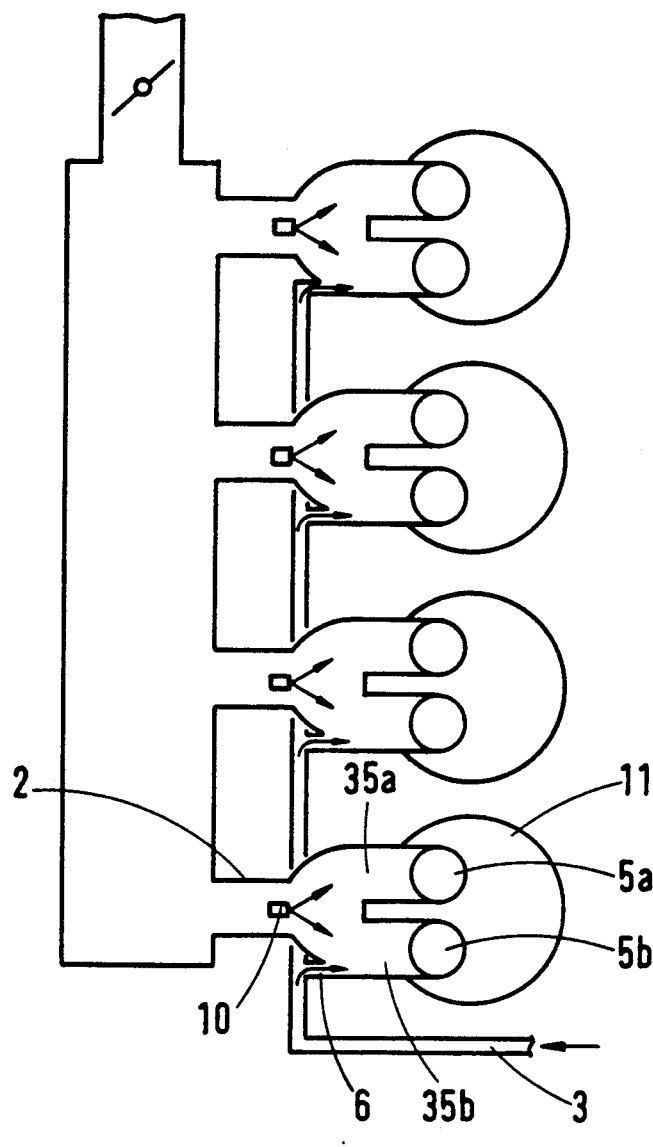
FIGS. 13 and 14 show the application of the invention of a cylinder having plural inlet valves.

FIG. 13 shows an example of the application of this invention to an engine having each cylinder 11 equipped with a plurality (two) of intake valves 5a and 5b. In this engine, the intake pipe 2 is branched (as indicated at 35a and 35b) in correspondence with the intake valves 5a and 5b. Either of the branched intake pipes 35a and 35b may be formed with the hole 6 for introducing the exhaust gas, but in the exemplary embodiment the hole is shown in pipe 35b. In the remaining cylinders, the exhaust gas is likewise fed only to the intake pipe corresponding to one of the intake valves. Here, the EGR gas is laminated by offsetting the feeder. The flow of the exhaust gas at this time may be continuous or intermittent.

Figure 14:
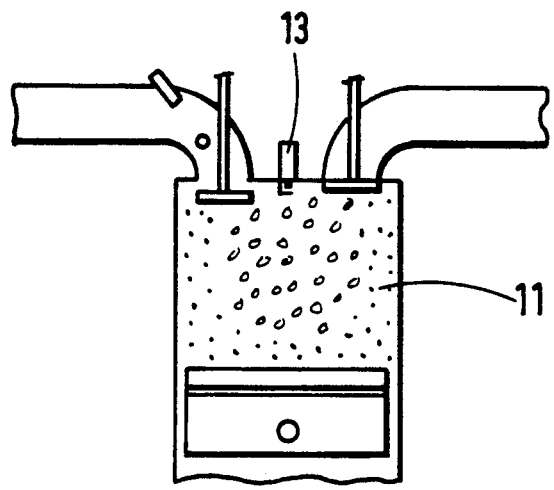

FIG. 14 shows the behaviour of the gas in the cylinder of such a case. Since the exhaust gas flows only from one intake valve 5b, the exhaust gas is distributed in the outer circumference of the cylinder, as shown in solid circles. The fresh mixture, as shown by clear circles, is distributed in the inside of the cylinder 11. Due to these distributions, the fresh mixture is concentrated around the ignition plug 13 so that the combustion is not deteriorated even if much EGR gas is introduced.

Figure 15A:
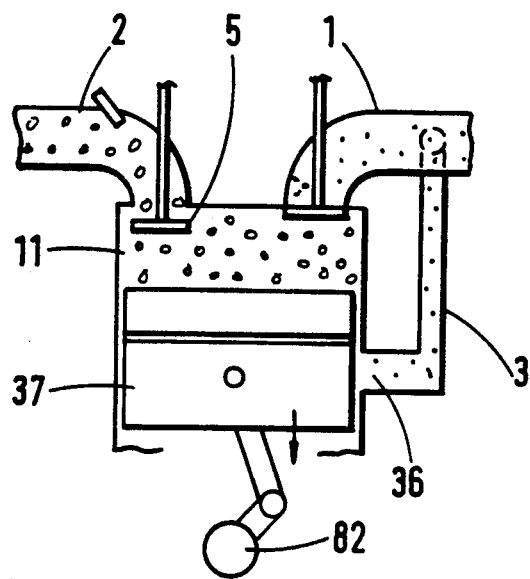
FIGS. 15(a) to (c) are diagrams showing the operational principle of an exhaust gas recirculation system in yet a further embodiment of the present invention.
Figure 15B:
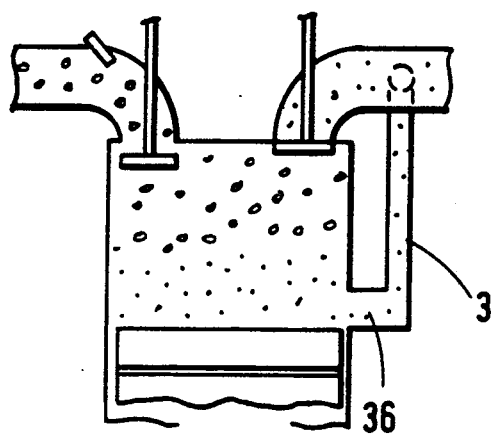
Figure 15C:
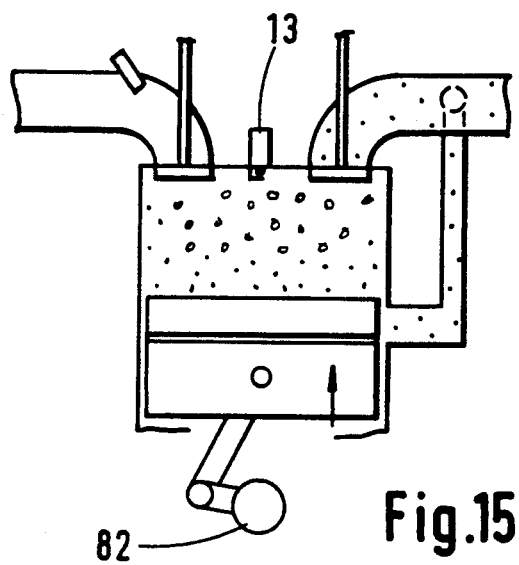

FIGS. 15(a) to (c) show yet another embodiment of the EGR gas feeding method. Here, the exhaust gas is fed not to the intake pipe but directly into the inside of the cylinder 11 of the engine. As shown in FIG. 15(a), the cylinder 11 has an exhaust gas feed hole 36 formed in a lower portion thereof. In such an embodiment there is no need to provide a feed hole valve. FIG. 15(a) shows the suction stroke, in which a piston 37 driven by a crankshaft 82 is moving to its lower position. In this state, only the fresh mixture flows into the cylinder 11 through the intake valve 5. The hole 36 is arranged to be opened when the piston comes close to the bottom dead center, as indicated at FIG. 15(b). Since, at this timing, the inside of the cylinder is slightly evacuated, the exhaust gas flows thereinto from the opening 36. However, the entrance is formed in the lower portion so that the exhaust gas is distributed only in the lower portion of the inside of the cylinder 11. In FIG. 15(c), the piston is again raised in the cylinder. Since the distribution of the fresh mixture is thus concentrated around the ignition plug, much EGR gas can be mixed without deteriorating the combustion. The passage 3 is branched into the individual cylinders.

Figure 16A:
FIGS. 16(a) and (b) are graphical diagrams showing the principle for determining an exhaust gas recirculation ratio.
Figure 16B:

FIG. 16 shows the method of detecting the amount of the EGR gas. This method can be applied to the system having the structures of FIGS. 1, 7 and 10 FIG. 16(a) shows the amount of the EGR gas to flow through the passage 3. FIG. 16(b) shows the output value $V_{AFM}$ of the intake air flow sensor 7 wherein the air quantity detected by the air flow sensor increases when EGR is switched OFF. When the engine running state is constant, the EGR gas is stopped by closing the control valve 4 so that the EGR ratio is determined from the change in the intake air flow at that time. The output value $V_{AFM}$, while the EGR gas is being fed, as shown in FIG. 16(a), is designated at $V_1$, as shown in FIG. 16(b). Next, the value $V_{AFM}$, when the EGR gas is OFF, is designated at $V_2$. The EGR ratio is determined from the difference between $V_1$ and $V_2$. Since the EGR gas is introduced downstream (at the engine side) of the intake air flow sensor 7, the intake air flow changes in dependence upon the presence or absence of the gas flow.

Figure 17:
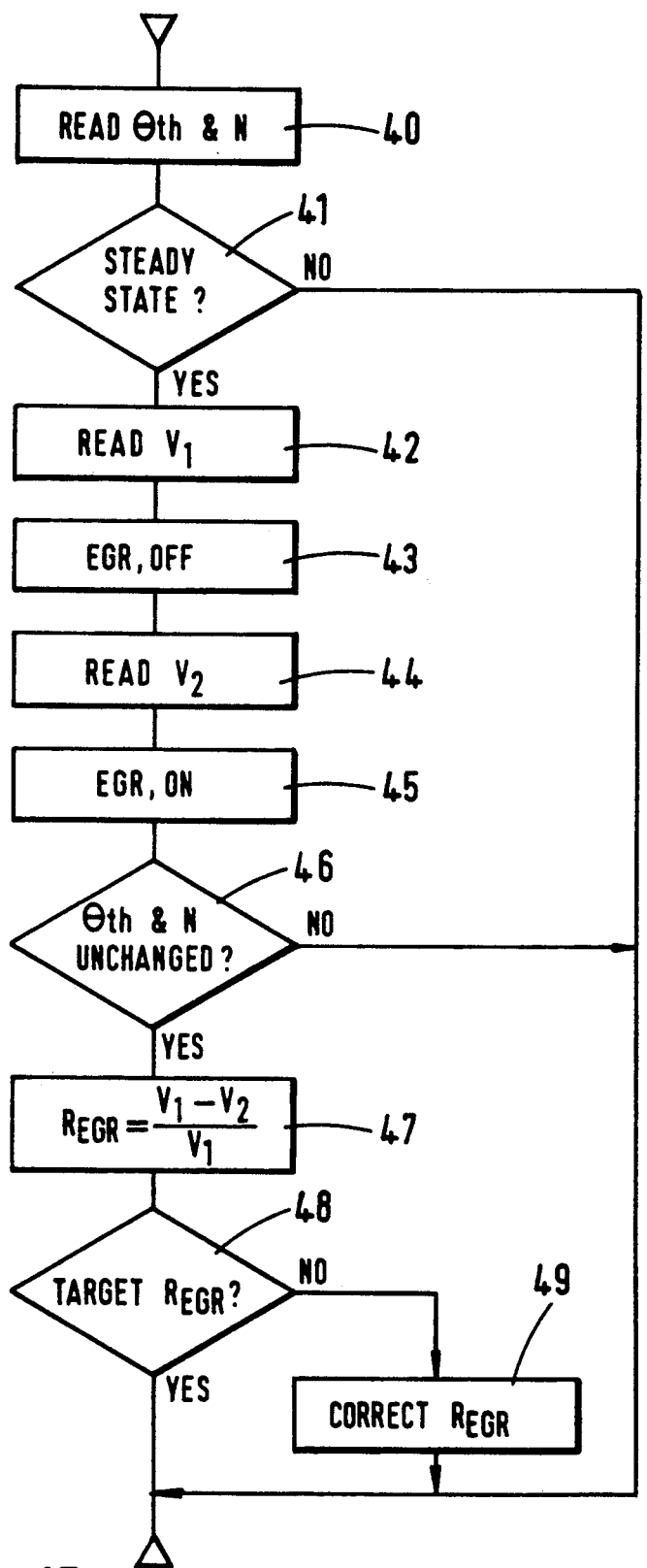
FIG. 17 shows a control flow diagram for the embodiment of FIG. 16.

FIG. 17 shows a flow diagram at the detection time. First of all, the throttle opening $\theta_{th}$ and the engine R.P.M. N are read (at Step 40). It is decided (at Step 41) whether or not the values $\theta_{th}$ and N are in the steady state. If NOT in the steady state, this program flow is ended. If in the steady state, the value $V_1$ for the EGR ON is read (at Step 42). Next, the EGR is turned OFF (at Step 43), and the value $V_2$ at this time is read (at Step 44). The EGR is turned ON again (at Step 45). At this time, it is checked (at Step 46) whether or not the values $\theta_{th}$ and N have been unchanged during Steps 40 to 46. If NO, this flow is ended without computing the EGR ration $R_{EGR}$. If YES, the computation of $(V_1 = V_2)/V_1$ is accomplished to determine the ratio $R_{EGR}$ (at Step 47). Next, it is decided (at Step 48) whether or not the detected ratio $R_{EGR}$ is coincident to the target value. If NO, the EGR ratio $R_{EGR}$ in this running state is corrected (at Step 49). If YES, the program flow is ended.

In the method described relative to FIG. 17, it will now be realised that the EGR ratio can be detected so that it can always be corrected to the target value for precise control even if the engine, the control valve 4, etc., vary with age.

Figure 18A:
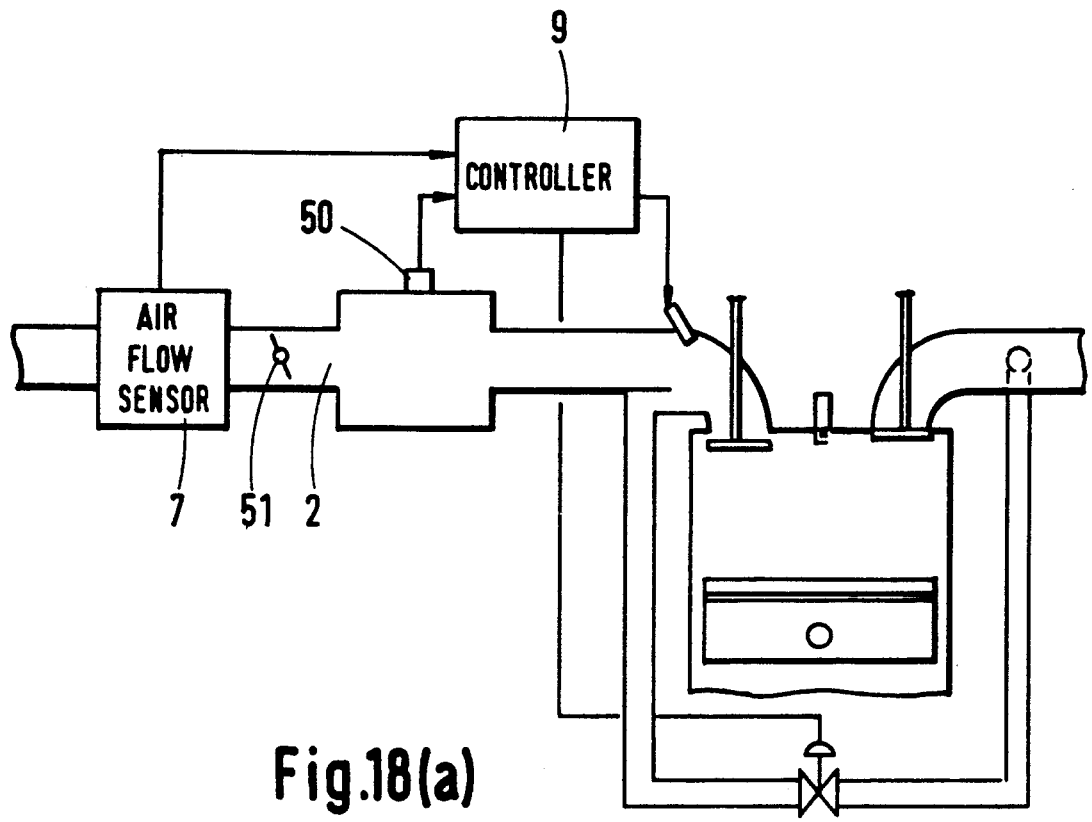
FIGS. 18(a) and (b) are schematic diagrams showing another method of determining the exhaust gas recirculation (EGR) ratio.
Figure 18B:
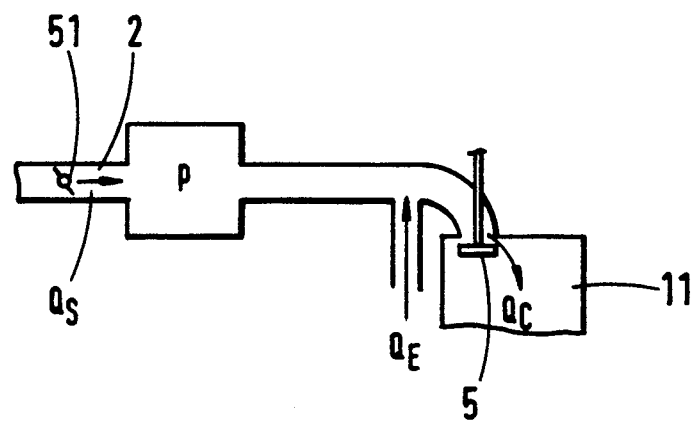

FIG. 18 shows another method of detecting the EGR ratio in which an intake pipe pressure sensor 50 is provided in addition to the intake air flow sensor 7. With this structure, the EGR ratio can be detected even in the unsteady running state. A simplified model of the structure shown in FIG. 18(a) is shown in FIG. 18(b). The flow rate of the air to pass through a throttle valve 51 is designated at $Q_s$ and is detected by the air flow sensor 7. The pressure in the intake pipe 2 is designated at P and is detected by the pressure sensor 50. The flow rate of the air to flow through the throttle valve 51 into the cylinder Il is designated at $Q_c$. Moreover, the EGR gas flow rate is designated at $Q_E$. Here, the values $Q_C$ and $Q_E$ are unknown. The method of detecting the ratio $R_{EGR}$ by using those parameters is shown in FIGS. 19 and 20. FIG. 19(a) shows the change in the pressure P in the unsteady state. The pressure one cycle (that is, 180 degrees in the four-cylinder four-cycle engine) after a pressure $P_1$ is designated at $P_2$. On the other hand, an integrated value $\overline{Q}_s$ of the air flow for one stroke is shown in FIG. 19(b). The ratio $R_{EGR}$ is determined on the basis of those values $P_1$, $P_2$ and $\overline{Q}_s$.

FIG. 20 shows a flow chart for this determination. The pressures $P_1$ and $P_2$ are read (at Step 52). The output of the air flow sensor 7 is integrated for one stroke to determine the value $\overline{Q}_S$ (at Step 53). Here, the individual parameters have the following relationships:

$$Q_S + Q_E - Q_C = K_1 \cdot dP/dt \tag{1}$$

If integrated:

$$Q_S + Q_E - Q_C = K_1 \cdot (P_1 - P_2)/dt \tag{2}$$

wherein:

$K_1$: a constant;

and

T: period for one stroke.

Without the EGR, $$Q_s' - Q_c' = K_1 \cdot (P_2' - P_1')/T \tag{3}$$

If equations (2) and (3) are rewritten:

$$Q_c - Q_E = Q_s - K_1 \cdot (P_2 - P_1)/T \tag{4}$$

and $$Q_C' = Q_S' - K_1 \cdot (P_2' - P_1')/T \tag{5}$$

The relationship between the pressure P and the flow $Q_c$ of the air to be sucked into the engine is expressed in the following manner by using a volumetric efficiency $\eta'$:

$$Q_c' = K_2 \cdot \eta' \cdot \overline{P} \tag{6}$$

wherein:

$\overline{P}$: an average pressure value for one stroke.

Without the EGR, the following equation is obtained:

$$\begin{aligned} \overline{Q}_c' &= \overline{Q}_s - K_1 \cdot (P_2' - P_1')/T \\ &= K_2 \cdot \eta' \cdot \overline{P} \end{aligned} \tag{7}$$

From equation (7), the volumetric efficiency $\eta'$ is determined, as follows:

$$\eta' = \frac{\overline{Q_s}' - K \cdot (P_2' - P_1')/T}{K_2 \cdot P} \quad (8)$$

In case the EGR is mixed, however, the volumetric efficiency $\eta'$ changes. This is because the value $\eta_E$ is determined from the equation (4) by the following equation:

$$\eta_E = \frac{\overline{Q_s} - K_1 \cdot (P_2 - P_1)/T}{K_2 \cdot P} \quad (9)$$

In short, the value $\eta$ changes by the value $\overline{Q}_E$ of the equation (4). In this detection method, the EGR ratio is determined from the change in the value $\eta$.

At Step 54, therefore, the following value $\Delta P = (P_2 - P_1)/T$ is computed. At Step 55, the equation (4) is computed. At Step 56, moreover, the value $\eta_E$ is determined. Here, this value $\eta_E$ and the value $\eta$ in the absence of the stored EGR are read out to determine the ratio $R_{EGR}$ from the difference between the values $\eta_E$ and $\eta'$, as follows:

$$R_{EGR} = (\eta' - \eta_E)/\eta' \quad (10)$$

This equation (10) is computed at Step 57.

By the method described above, the ratio $R_{EGR}$ is determined so that it may always be controlled to the target value.

Figure 21:
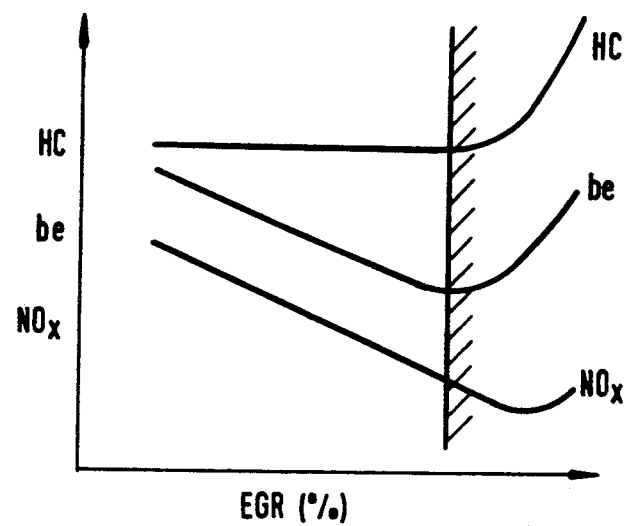
FIG. 21 is a characteristic diagram showing the EGR ratio and various other parameters.

FIG. 21 shows the relationship between the EGR ratio and the fuel consumption be and the exhausts of HC and NOx.

As the EGR ratio increases, the values be and NOx will drop. When the EGR ratio exceeds a particular limit value, the values HC, be and NOx will, again, increase. The turning point of HC, be and NOx define the limit EGR ratio. If the EGR is increased over the turning point, the engine misfires to increase the values HC and be. From the standpoint of the control, the EGR ratio to be fed is desirably determined to minimize the value be. A method of detecting the limit EGR ratio to fix it at all times will now be described.

Figure 22A:
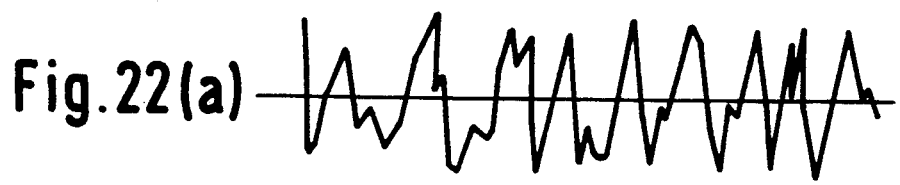
FIGS. 22(a) and (b) are graphical diagrams showing the output of the $O_2$ sensor.
Figure 22B:
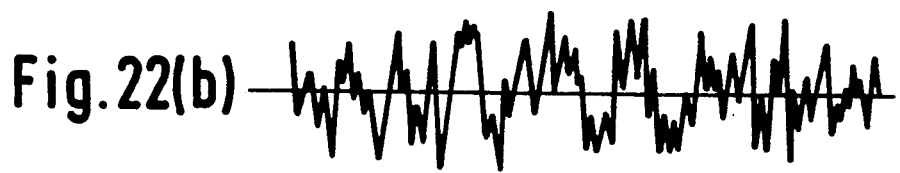
Figure 23A:
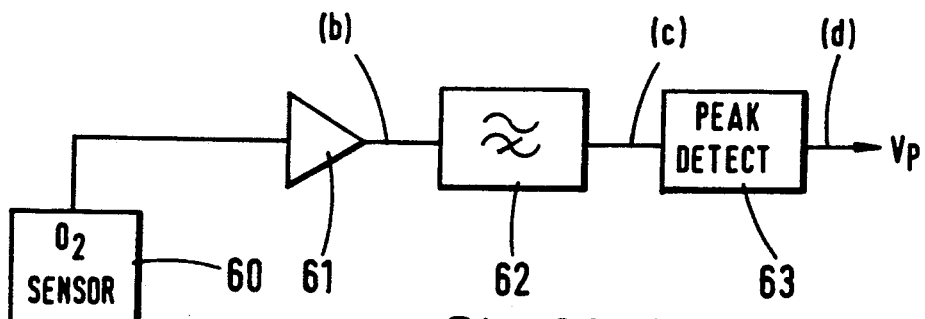
FIG. 23(a) is a circuit diagram.
Figure 23B:
FIGS. 23(b) to (d) show the roughness detected by the output of the $O_2$ sensor.
Figure 23C:
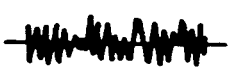
Figure 23D:
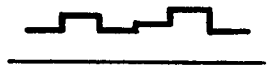
Figure 24A:
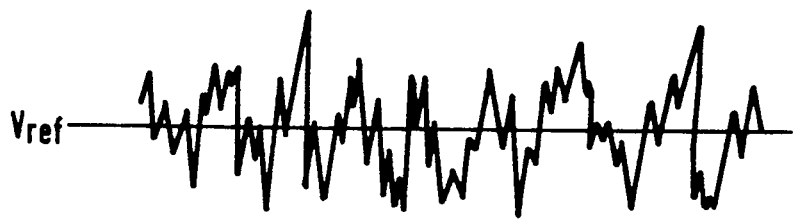
FIGS. 24(a) to (e) show graphical diagrams of another manner of detecting roughness.
Figure 24B:
Figure 24C:
Figure 24D:
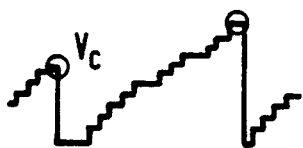
Figure 24E:
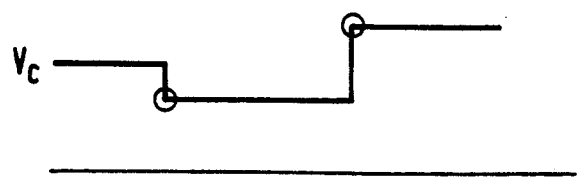

Whether or not the EGR ratio is at the limit value is decided by detecting the roughness of the engine. FIG. 22 shows the principle for detecting the roughness with an oxygen sensor (herein referred to as an "O₂ sensor", as shown by reference numeral 8 in FIG. 1). FIG. 22(a) shows the signal of the O₂ sensor for the proper EGR ratio. FIG. 22(b), on the other hand, shows the signal of the O₂ sensor when the limit of the EGR ratio is exceeded. The signal of FIG. 22(b) contains signal disturbances due to misfire. The degree of the disturbances is detected and used as the roughness of the engine. This engine roughness to be used can be detected in terms of the fluctuations of the engine R.P.M. and the vacuum in the intake pipe.

FIG. 23 shows a method for detecting the degree of roughness from the signal shown in FIG. 22(b). An example of the circuit for the method is shown in FIG. 23(a). The signal of an O₂ sensor 60 is inputted to an amplifier 61. After amplification, the high-frequency component of the signal is extracted through a high-pass filter 62, and its peak is detected by a peak hold 63 and is used as the measurement of roughness. The signals (b) to (d), shown in FIG. 23(a), are shown in FIGS. 23(b) to (d) respectively. The original signal (FIG. 23(b)) having passed through the high-pass filter 62 is shown in FIG. 23(c). This filtered signal indicates the degree of engine roughness. This signal is processed for the peak hold into a level signal, as shown at FIG. 23(d). The controller 9 decides the degree (amount) of engine roughness according to the magnitude of the signal (d). The value of this signal (d) is designated at $V_P$.

FIG. 24 shows another method of detecting the degree of roughness. FIG. 24(a) shows the original signal of the O₂ sensor. This signal is compared with a constant reference value $V_{ref}$ by a comparator so that it is converted into a signal shown in FIG. 24(b). The ON/OFF period of this signal (b) corresponds to the degree of engine roughness. The ON/OFF number of this signal (b) is counted by a counter circuit. If the reset pulses (FIG. 24(c)) are inputted to the counter circuit, they are counted up, as shown at FIG. 24(d), each time the signal of FIG. 24(b) is turned ON and OFF. Next, the counted value until the reset pulse is inputted is held, as shown at FIG. 24(e). In terms of this hold value $V_c$, the controller decides the degree of engine roughness. In short, the degree of roughness is determined to be higher for the higher hold valve $V_c$.

Figure 25:
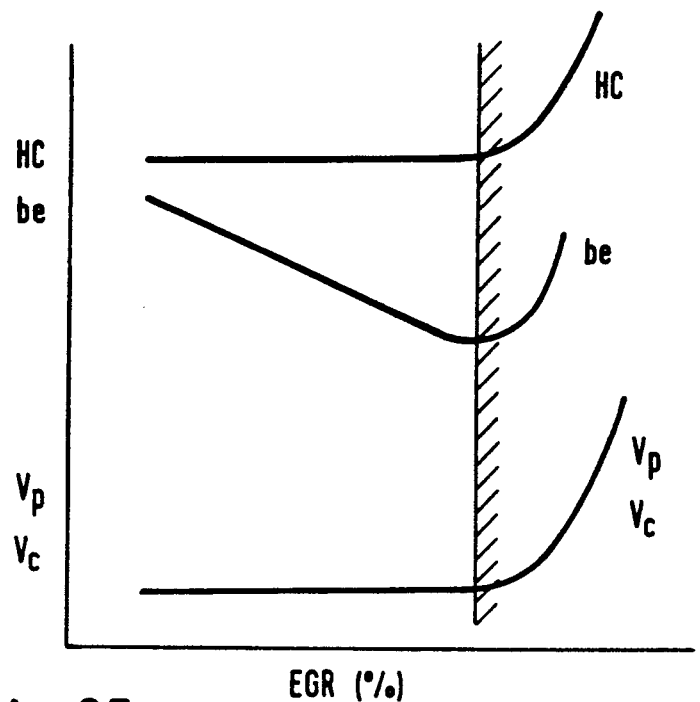
FIG. 25 is a diagram showing the relationship between the EGR ratio and the other parameters.

FIG. 25 shows the relationships between the changing EGR ratio and the values HC, be. $V_P$ and $V_c$. If the EGR exceeds the turning point at which the values HC and be increase, the values $V_P$ and $V_c$ also increase, from which the limit EGR ratio can be decided.

Figure 26:
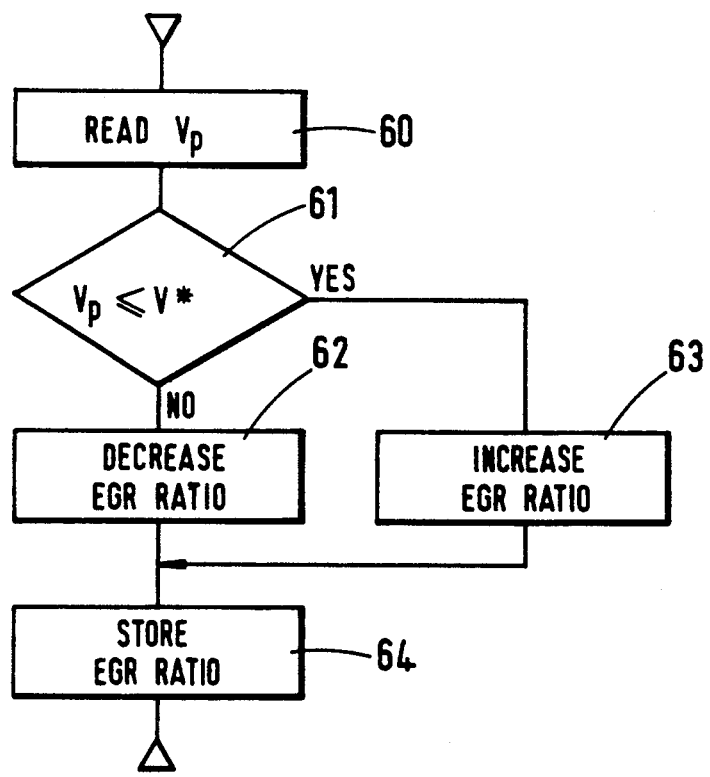
FIGS. 26 and 27 are control flow diagrams of the limit EGR control.

FIG. 26 shows a flow diagram for the limit EGR control, which corresponds to the embodiment of FIG. 23. First of all, the value $V_P$ is read (at Step 60). It is then decided (at Step 61) whether or not the value $V_P$ exceeds a reference value $V^*$. If the value $V_P$ is smaller than the value $V^*$, it is decided that the limit EGR ratio is not reached yet, and the EGR ratio is increased (at Step 63). If the value $V_P$ is larger than the value $V^*$, it is decided that the limit EGR ratio is exceeded, and the EGR ratio is decreased (at Step 62). The newly determined EGR ratios are stored in the memory (at Step 64). Thus, the controls can always be accomplished with the EGR ratio which is the closest to the limit.

Figure 27:
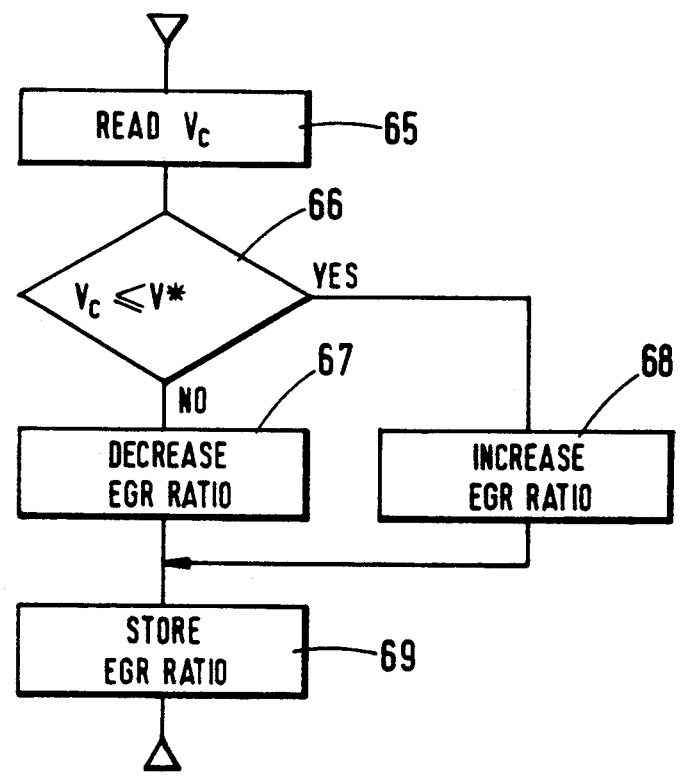

FIG. 27 shows a control flow diagram for the arrangement described with regard to FIGS. 24 (a) to (e). The value $V_c$ is read (at Step 65) and is compared with the reference value $V^*$ (at Step 66). If $V_c > V^*$, the EGR ratio is decreased (at Step 67). If $V_c \leq V^*$, the EGR ratio is increased (at Step 68). After this, the EGR ratio is stored (at Step 69) in the memory position corresponding to the running state at that time.

By the present invention, the combustion is not deteriorated even if more EGR gas is mixed in a cylinder than is possible in the system of the prior art. Thus, it is possible to drastically reduce the fuel consumption and the exhaust of NOx.

It is to be understood that the invention has been described with reference to exemplary embodiments, and modifications may be made without departing from the spirit and scope of the invention as defined in the appended claims.

We claim:

1. An exhaust gas recirculation flow control system comprising:
   (a) an intake passage connected to feed an air/fuel mixture to an internal combustion engine;
   (b) an exhaust passage connected to discharge an exhaust gas from said internal combustion engine;
   (c) an exhaust gas recirculation passage for feeding a portion of the exhaust gas of said exhaust passage to the vicinity of an intake valve disposed in said intake passage;

(d) a recirculation control valve disposed in said exhaust gas recirculation passage for recirculating the exhaust gas at a predetermined timing and for a predetermined period during the strokes of said internal combustion engine; and (e) timing means connected to control said control valve to feed exhaust gas to a cylinder of said engine in synchronism with and overlapping a first half of a suction stroke of said cylinder.

2. An engine exhaust gas recirculation system comprising:

(a) an intake passage connected to feed an air/fuel mixture to an internal combustion engine;

(b) an exhaust passage connected to discharge an exhaust gas from said internal combustion engine;

(c) an exhaust gas recirculation passage for feeding a portion of the exhaust gas of said exhaust passage to a cylinder of said engine;

(d) a pressure sensor for detecting intake manifold pressure of said engine;

(e) an airflow rate sensor for detecting the flow rate of air passing through a throttle valve of said engine;

(f) computing means for computing
  (i) volumetric efficiency under existence of exhaust gas recirculation obtained from said pressure sensor and said airflow sensor, and
  (ii) for determining the volumetric efficiency without the existence of exhaust gas recirculation, and
  (iii) for comparing the volumetric efficiency under the existence of exhaust gas recirculation with volumetric efficiency without the existence of exhaust gas recirculation so as to thereby calculate the exhaust gas recirculation rate; and (g) means for controlling the calculated exhaust gas recirculation ratio to be a predetermined target value.

3. An exhaust gas recirculation flow control system comprising:

(a) an intake passage connected to feed an air/fuel mixture to an internal combustion engine;

(b) an exhaust passage connected to discharge an exhaust gas from said internal combustion engine;

(c) an exhaust gas recirculation passage for feeding a portion of the exhaust gas of said exhaust passage to the vicinity of an intake valve disposed in said intake passage;

(d) a recirculation control valve disposed in said exhaust gas recirculation passage for recirculating the exhaust gas at a predetermined timing and for a predetermined period during the strokes of said internal combustion engine;

(e) control means for detecting the degree of roughness of the internal combustion engine to feed said recirculation control valve in said recirculation passage with a control signal for controlling the recirculation flow in accordance with said degree of roughness; and (f) timing means for feeding said portion of the exhaust gas from said exhaust passage into said cylinder in laminar form with said air/fuel mixture, such that the air/fuel mixture is adjacent an ignition plug and said portion of the exhaust gas is distributed in said cylinder away from said ignition plug, said timing means being connected to control said recirculation control valve for feeding exhaust gas to a cylinder in synchronism with and overlapping a suction stroke of said cylinder.

4. An exhaust gas recirculation flow control system comprising:

(a) an intake passage connected to feed an air/fuel mixture to an internal combustion engine;

(b) an exhaust passage connected to discharge an exhaust gas from said internal combustion engine;

(c) an exhaust gas recirculation passage for feeding a portion of the exhaust gas of said exhaust passage to the vicinity of an intake valve disposed in said intake passage;

(d) a recirculation control valve disposed in said exhaust gas recirculation passage for recirculating the exhaust gas at a predetermined timing and for a predetermined period during the strokes of said internal combustion engine;

(e) control means for detecting the degree of roughness of the internal combustion engine to feed said recirculation control valve in said recirculation passage with a control signal for controlling the recirculation flow in accordance with said degree of roughness; and (f) timing means for feeding said portion of the exhaust gas from said exhaust passage into said cylinder in laminar form with said air/fuel mixture, such that the air/fuel mixture is adjacent an ignition plug and said portion of the exhaust gas is distributed in said cylinder away from said ignition plug, said timing means being connected to control said recirculation control valve to feed exhaust gas to said cylinder overlapping a first half of the suction stroke of said cylinder.

* * * * *